(12) United States Patent  
Kosnas

(10) Patent No.: US 11,911,690 B2  
(45) Date of Patent: Feb. 27, 2024

(54) MULTIAXIS MANIPULATION CONTROL DEVICE

(71) Applicant: 9 AXIS KFT., Etyek (HU)

(72) Inventor: Robin Kosnas, Budapest (HU)

(73) Assignee: 9 AXIS KFT., Magyarorszag (HU)

( * ) Notice: Subject to any disclaimer, the term of this patent is extended or adjusted under 35 U.S.C. 154(b) by 303 days.

(21) Appl. No.: 17/608,585

(22) PCT Filed: Feb. 21, 2020

(86) PCT No.: PCT/EP2020/054670  
§ 371 (c)(1),  
(2) Date: Nov. 3, 2021

(87) PCT Pub. No.: WO2020/224821  
PCT Pub. Date: Nov. 12, 2020

(65) Prior Publication Data  
US 2022/0226723 A1    Jul. 21, 2022

(30) Foreign Application Priority Data

May 3, 2019 (HU) .................................. U1900078  
May 15, 2019 (EP) ..................................... 19462002

(51) Int. Cl.  
*A63F 13/24* (2014.01)

(52) U.S. Cl.  
CPC .................................. *A63F 13/24* (2014.09)

(58) Field of Classification Search  
CPC .......... A63F 13/20; A63F 13/21; A63F 13/22; A63F 13/23; A63F 13/24; A63F 13/245; A63F 13/92; A63F 2300/10; A63F 2300/1006; A63F 2300/1018; A63F 2300/1043; A63F 2300/1062  
See application file for complete search history.

(56) References Cited

U.S. PATENT DOCUMENTS

| | | | |
|---|---|---|---|
| 6,664,946 B1* | 12/2003 | Stipes | G06F 3/0354 345/157 |
| 10,188,940 B2* | 1/2019 | Burgess | A63F 13/22 |
| 11,013,986 B2* | 5/2021 | Ironmonger | A63F 13/24 |
| 2006/0025217 A1* | 2/2006 | Hussaini | A63F 13/24 463/36 |
| 2010/0087252 A1* | 4/2010 | Tan | A63F 13/24 463/37 |
| 2010/0279773 A1* | 11/2010 | Atzmon | A63F 13/06 463/38 |
| 2010/0298053 A1* | 11/2010 | Kotkin | A63F 13/98 463/37 |
| 2012/0021834 A1* | 1/2012 | Garcia | A63F 13/24 345/161 |
| 2017/0189802 A1* | 7/2017 | Rogoza | A63F 13/24 |
| 2018/0200617 A1* | 7/2018 | Tiffany | A63F 13/24 |

* cited by examiner

*Primary Examiner* — Omkar A Deodhar

(57) ABSTRACT

The multiaxis manipulation control device (10) at least one thumb mechanism(s) arranged on a housing with an electronic circuitry to process the sensor signals which generates and transmits manipulation control signals to a processor device. Each thumb mechanism has a thumb securing unit (50) to hold a user's thumb and a thumb linkage to connect the thumb securing unit (50) to the housing (11) and a sensor unit for detecting movements of the thumb securing unit (50) independently in three directions and providing a sensor signal.

13 Claims, 10 Drawing Sheets

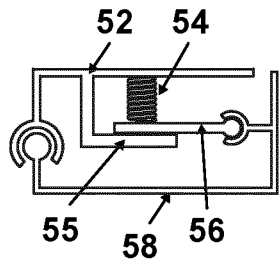
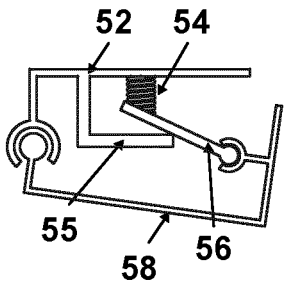
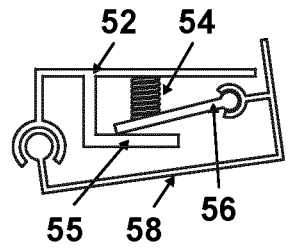
FIG. 6A  FIG. 6B  FIG. 6C
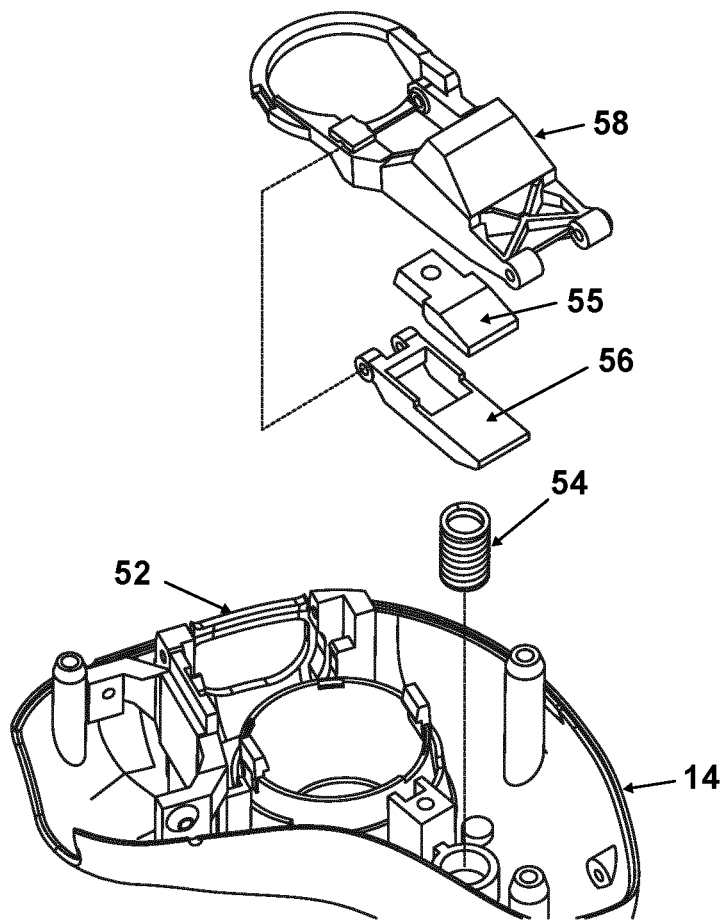
FIG. 7

MULTIAXIS MANIPULATION CONTROL DEVICE

FIELD OF THE INVENTION

The present invention relates to an electronic manipulation control device. More particularly, the present invention relates to a two-handed manipulation control device providing multiaxis control of movements of an object or objects manipulated simultaneously in a physical or virtual environment.

BACKGROUND OF THE INVENTION

Currently, various types of manipulation control devices are known. For example, a mouse or a joystick may be used to manipulate a graphical object in a computer environment. Two-handed gamepad controllers are also widely used to control various movements in video games or simulation applications. These devices are designed to include a mechanical control of movements in up to two degrees of freedom per hand, while any additional manipulation control can be provided by operating push buttons or triggers mounted on the housing of the manipulation control device.

Video games are constantly evolving, therefore more and more additional input controls are required to manipulate in-game avatars or to execute game mechanics. On commercially available standard videogame controllers, this problem is solved by implementing additional push buttons on the housing of the gamepads. The ascending number of button inputs on said devices, however, are making the control and mastering the games a difficult task. Furthermore, the most versatile fingers, the thumbs are not being used to their full range of motion input potential.

There are controllers specifically designed for virtual reality environments which are being used almost exclusively in first-person view applications. These devices which are worn on the hands allow the movements of the user to be transposed to digital input with complete six degrees of freedom. The said devices however demand the user's full arm range of motion and a large operating area to execute inputs for control manipulation. The operation of these devices requires a lot of energy input by the user, therefore these controllers are not suitable for minimum effort device operation, which would only require minimal operating space and the use of fingers and wrist.

U.S. Pat. No. 6,664,946 describes a two-handed computer input device allowing dual axis articulated movement. Although this device provides a convenient use for video game players, it still only allows mechanical manipulation control along two axes and does not have a resetting mechanism to set the input back to a neutral zero signal, idle position. Further manipulation control operations can be performed using multiple control buttons arranged on the housing of the device. To manipulate control by using push buttons is less convenient and difficult.

Therefore, there is a need for a two-handed manipulation control device that provides a more intuitive, more realistic and a minimum effort manipulation by utilizing the anatomical structure of the hands to the maximum extent by involving the thumb fingers and the wrist of a user to create input controls in a synchronized way without relying on button input for complicated actions.

By using such a device, it is possible for the user to simultaneously manipulate more than one object. A digital game avatar, for example, can be navigated in a virtual space while the game avatar's left and right limbs can also be manipulated with the device's mechanical inputs at the same time. Another example is in a real-world environment where multiple physical elements of an electronic surgical apparatus can be operated simultaneously by a single device user.

It is an object of the present invention to provide a manipulation control device that can be conveniently operated with minimum effort by two hands, in particular by the two thumbs and wrist of a user.

It is another object of the present invention to provide a two-handed manipulation device that is capable of controlling movements of an object or objects simultaneously in a physical or virtual environment by up to nine degrees of freedom.

SUMMARY OF THE INVENTION

The above objects are achieved by providing a multiaxis manipulation control device comprising a housing, at least one thumb mechanism arranged on the housing, each thumb mechanism comprising a thumb securing unit for holding a user's thumb and a thumb linkage connecting said thumb securing unit to the housing, and further comprising a sensor unit for detecting movements of the thumb securing unit independently in three directions and providing a sensor signal. The device further comprises an electronic circuitry for processing said sensor signals and based on said sensor signals, generating and transmitting manipulation control signals to a processor device. The thumb linkage includes a first coupling mechanism allowing the securing unit to pivot around a first axis and a second axis perpendicular to said first axis, and at least for one thumb mechanism, a second coupling mechanism allowing the thumb securing unit to move along a third axis, which is perpendicular to said first and second axes and aligns with a longitudinal axis of the thumb mechanism. The sensor unit of each thumb mechanism comprises a dual axis position sensing unit arranged in said first coupling mechanism for detecting the displacement of the thumb securing unit around the first and second axes, and the sensor unit of at least one thumb mechanism further comprises a single axis position sensing unit arranged in said second coupling mechanism for detecting the displacement of the thumb securing unit along the third axis.

Various embodiments of the manipulation control device are defined by the dependent claims.

BRIEF DESCRIPTION OF THE DRAWINGS

FIG. 4A illustrates a dual axis Hall sensor unit in front elevation view in an exemplary embodiment of the device according to the invention.

FIG. 4B illustrates the sensor unit of FIG. 4A in side elevation view.

FIGS. 6A to 6C schematically illustrate the operation of a single axis coupling mechanism of a thumb securing unit that can be used in the manipulation control device according to the invention.

FIG. 7 is an exploded view of an exemplary embodiment of the single axis coupling mechanism of the thumb securing unit of the manipulation control device according to the invention.

FIG. 11C illustrate the steps of assembling the two handle members of the manipulation control device according to the first aspect of the present invention.

DETAILED DESCRIPTION OF THE INVENTION

Figure 1:
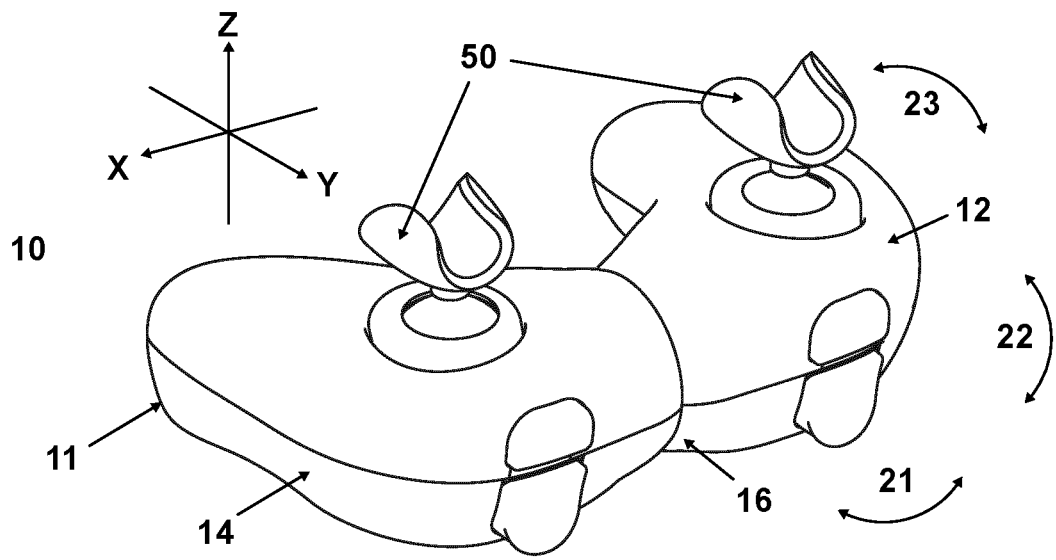
FIG. 1 is an illustrative embodiment of the manipulation control device in perspective view in accordance with a first aspect of the present invention.

As shown in FIG. 1, one embodiment of the manipulation control device 10 is provided with a housing 11 formed of two pieces, namely first and second handle members 12 and 14, respectively. The handle members 12 and 14 are sized to fit within the hand of the user and are movable relative to one another along three axes. The handle members 12 and 14 are connected by a linkage generally illustrated at 16. The linkage 16 allows the second handle member 14 to be articulated relative to the first handle member 12 in a yaw direction (around the Z-axis) generally indicated by arrow 21. The linkage 16 also allows the second handle member 14 to be pivoted in a roll direction (around the Y-axis) generally indicated by arrow 22. The linkage 16 also allows the second handle member 14 to be pivoted in a pitch direction (around the X-axis) generally indicated by arrow 23. This motion, and linkage 22, is described in greater detail later in the specification. In addition, the manipulation control device 10 includes angular position sensors which sense the angular position of the second handle member 14 relative to the first handle member 12.

Figure 2A:
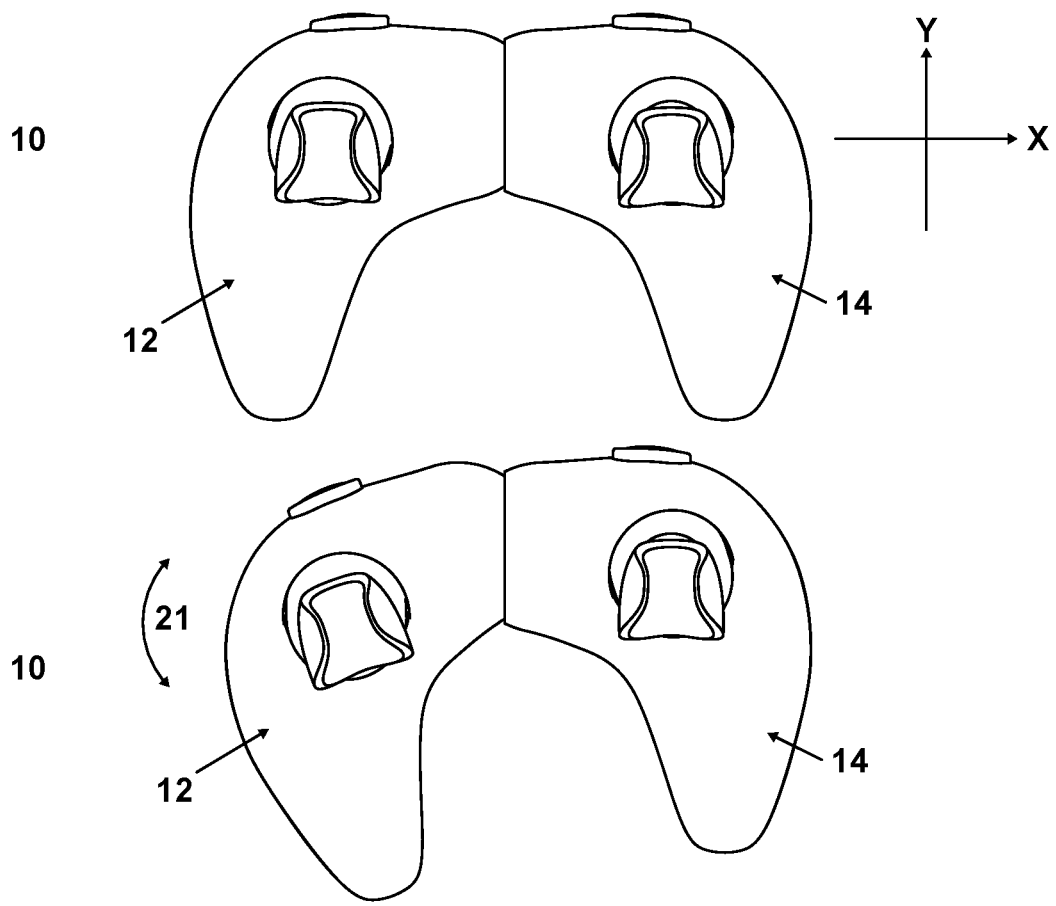
FIG. 2A illustrates the manipulation control device of FIG. 1 in top plan view in an idle position and a yaw position.
Figure 2B:
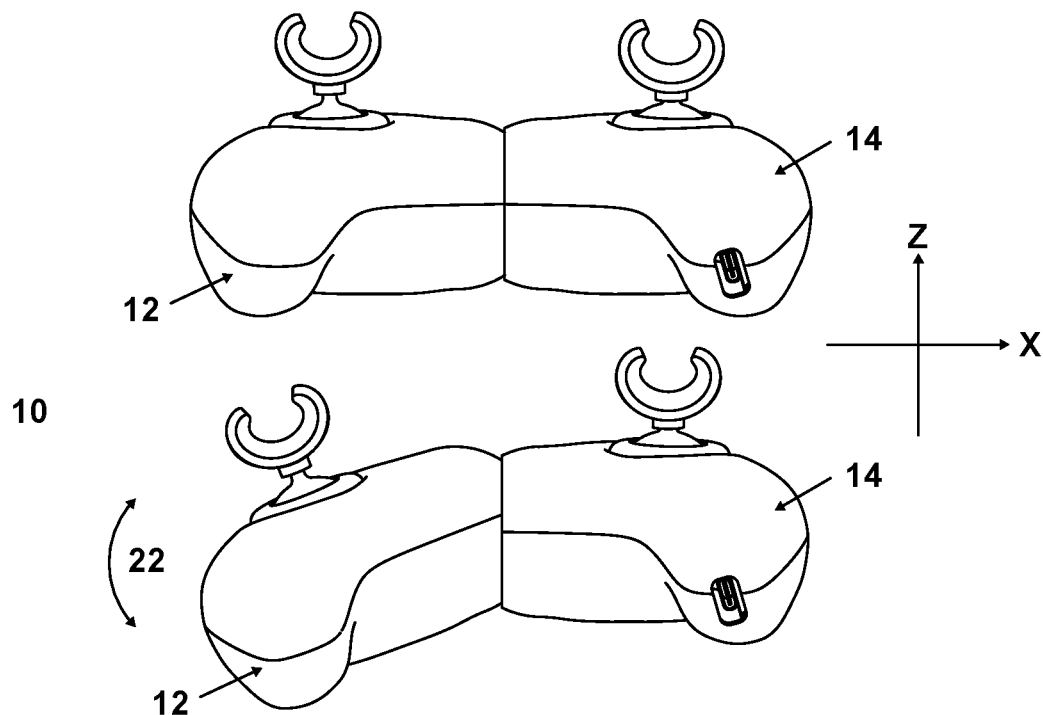
FIG. 2B illustrates the manipulation control device of FIG. 1 in front elevation view in an idle position and a roll position.
Figure 2C:
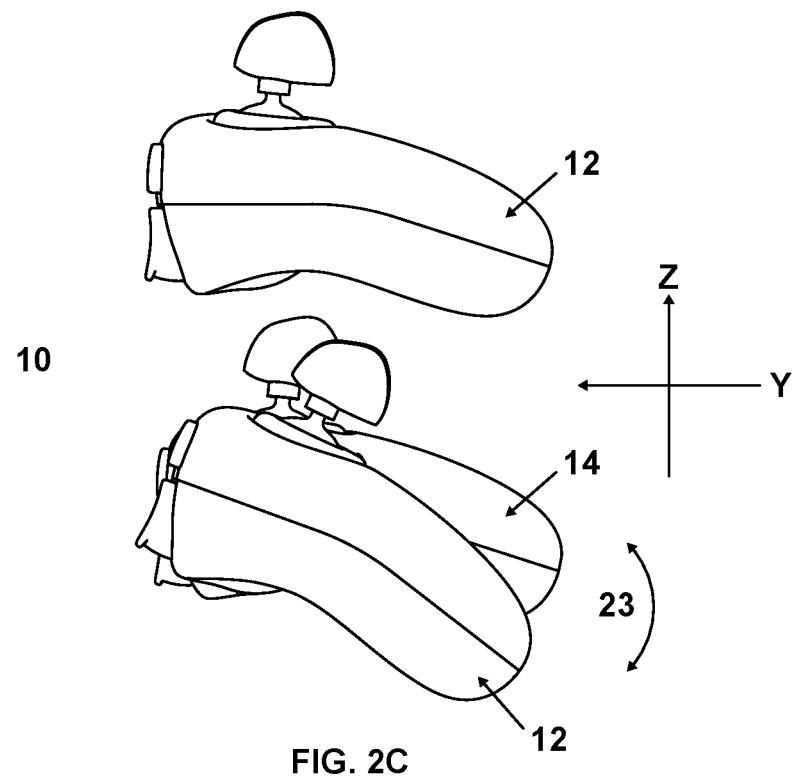
FIG. 2C illustrates the manipulation control device of FIG. 1 in side elevation view in an idle position and a pitch position.

FIG. 2A illustrates the manipulation control device 10 in top plan view in a yaw position (above) and an idle position (below), wherein the second handle member 14 is rotated relative to the first handle member 12 around the Z-axis or within the X-Y plane. FIG. 2B illustrates the manipulation control device 10 in front elevation view in a roll position (above) and an idle position (below), wherein the second handle member 14 is rotated relative to the first handle member 12 around the Y-axis or within the X-Z plane. FIG. 2C illustrates the manipulation control device 10 in side elevation view in a pitch position (above) and an idle position (below), wherein the second handle member 14 is rotated relative to the first handle member 12 around the X-axis or within the Y-Z plane.

Figure 3A:
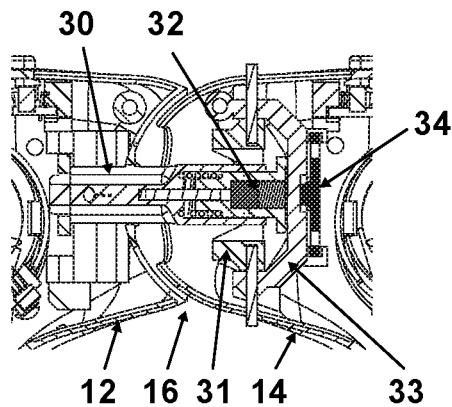
FIGS. 3A and 3B illustrate an exemplary dual axis coupling mechanism of the linkage of the manipulation control device in cross-sectional view in an idle position and in a yaw position.
Figure 3B:
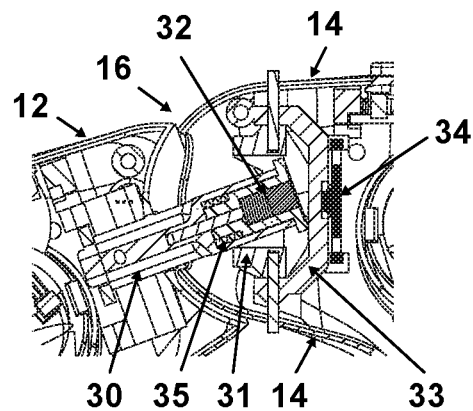

FIGS. 3A and 3B show an exemplary coupling mechanism of the linkage 16 in cross-sectional view in an idle position and in a yaw position, respectively. The second handle member 14 may comprise a hollow shaft 30 which intrudes into the first handle member 12. At the outer end of the shaft 30, a piston 31 may be arranged in the shaft 30 in a movable configuration.

In the idle state shown in FIG. 3A, the piston 31 is forced to lean against a front face of a counter-piece 33 by means of a loaded spring 35 arranged inside the hollow of the shaft 30.

In this exemplary coupling mechanism, detection of the angular displacement between the two handle members 12, 14 is performed using a position sensor unit comprising a Hall sensor. At the outer end of the piston 31, a permanent magnet 32 may be secured to the piston 31. Adjacent to said outer end of the shaft 30, a Hall sensor 34 is arranged inside the second handle member 14, just behind the counter-piece 33.

When the first and second handle members 12, 14 rotate with respect to each other, as shown in FIG. 3B, the shaft 30 angularly displaces with respect to the counter-piece 33 while the piston 31 is pushed into the hollow of the shaft 30 to some extent against the force of the loaded spring 35. In this way, the spring 35 will be compressed to a higher extent and rotation of the first handle member 12 relative to the second handle member 14 generates a returning force through the compressed spring 35. Due to this returning force, the dual axis position sensing unit has a specific zero position, which allows a very accurate manipulation as a result of the elimination of the accumulative positioning errors.

At a relative angular displacement between the first and second handle members 12, 14, the Hall sensor 34 generates a sensor signal that is proportional to the angle of the relative rotation between the two handle members 12, 14.

Figure 4C:
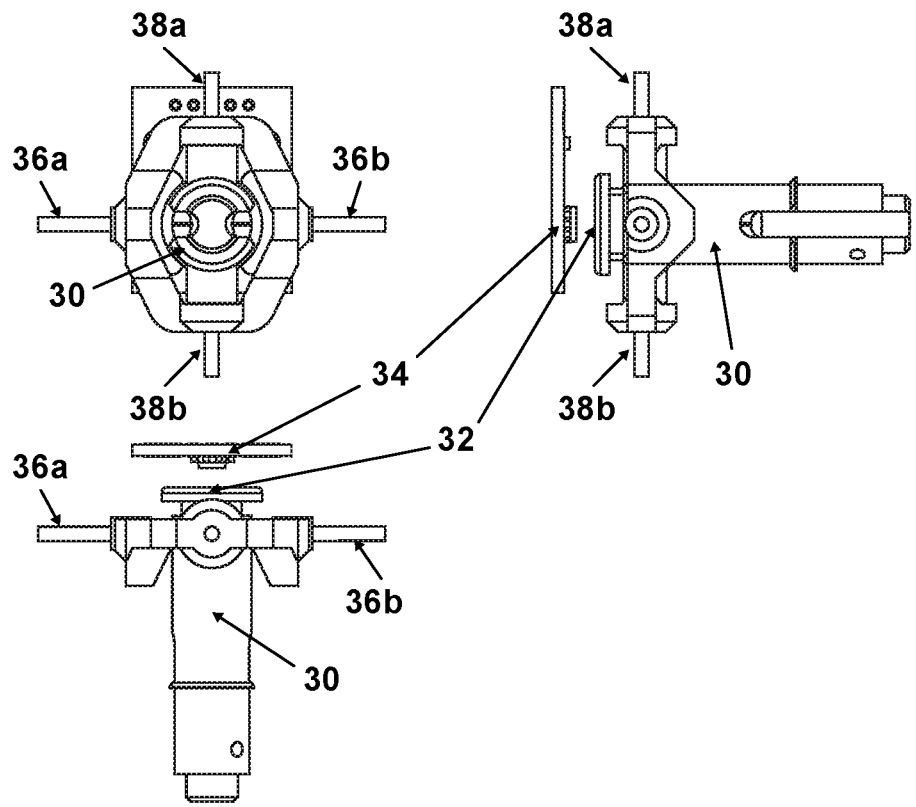
FIG. 4C illustrates the sensor unit of FIG. 4A in top plan view.
Figure 4D:
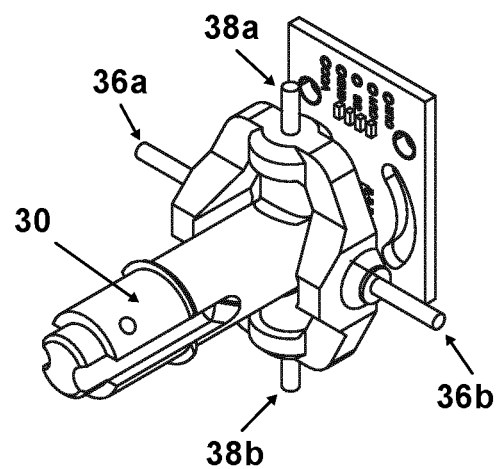
FIG. 4D illustrates the sensor unit of FIG. 4A in perspective view.
Figure 4E:
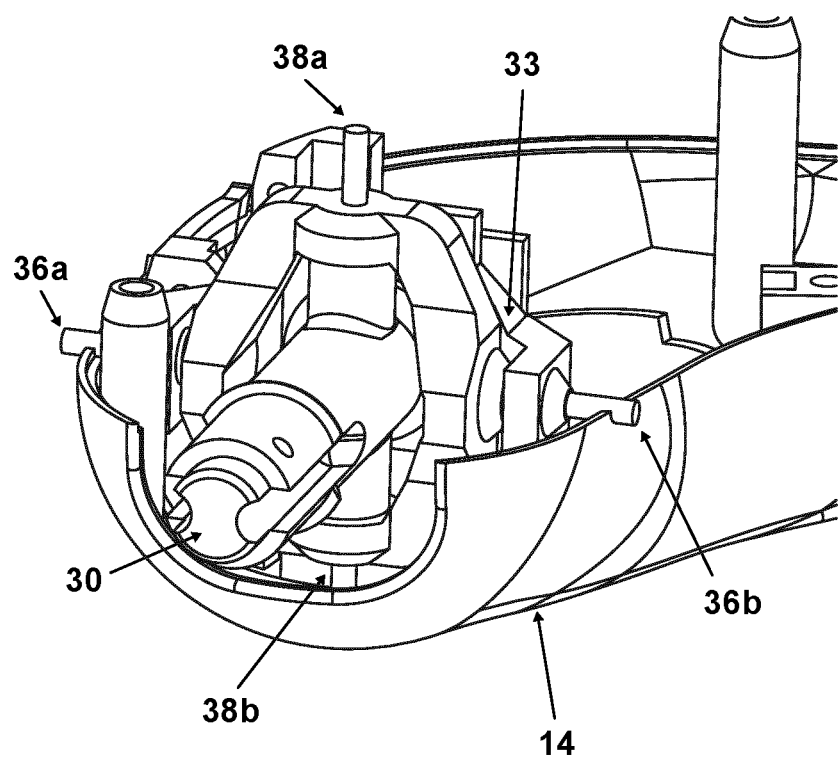
FIG. 4E shows the sensor unit of FIG. 4A when mounted in a handle member of the manipulation control device according to the first aspect of the present invention.

In one embodiment of the device 10, the Hall sensor 34 may be a dual axis sensor adapted for sensing relative rotation of the handle members 12, 14 around both the Y-axis and the Z-axis. FIG. 4A illustrates a dual axis Hall sensor unit in a front view in more detail, FIG. 4B illustrates the same sensor unit in a side view, FIG. 4C illustrates the sensor unit in a top plan view, and FIG. 4D illustrates the sensor unit in perspective view. FIG. 4E is a perspective view of the articulation mechanism with the dual axis Hall sensor unit mounted into the second handle member 14 of the input device 10.

Although the exemplary coupling mechanism described herein employs a Hall sensor as a position sensor, it should be appreciated by those skilled in the art that other types position sensors, such as optical sensor, electromechanical sensor, and the like, may also be used in the manipulation control device 10 for sensing the relative angular displacement between the first and second handle members 12, 14.

Figure 5A:
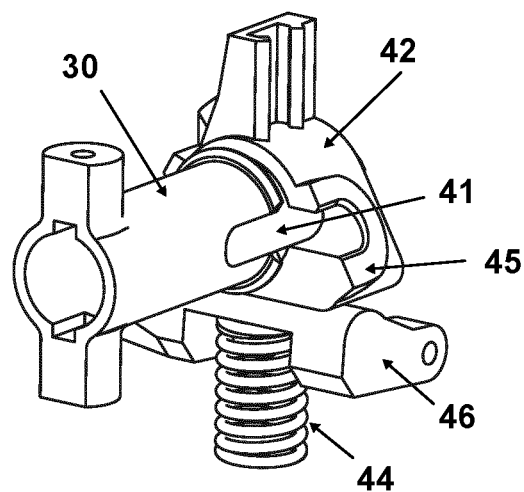
FIGS. 5A and 5B illustrate an exemplary single axis coupling mechanism of the linkage of the manipulation control device according to the first aspect of the present invention.
Figure 5B:
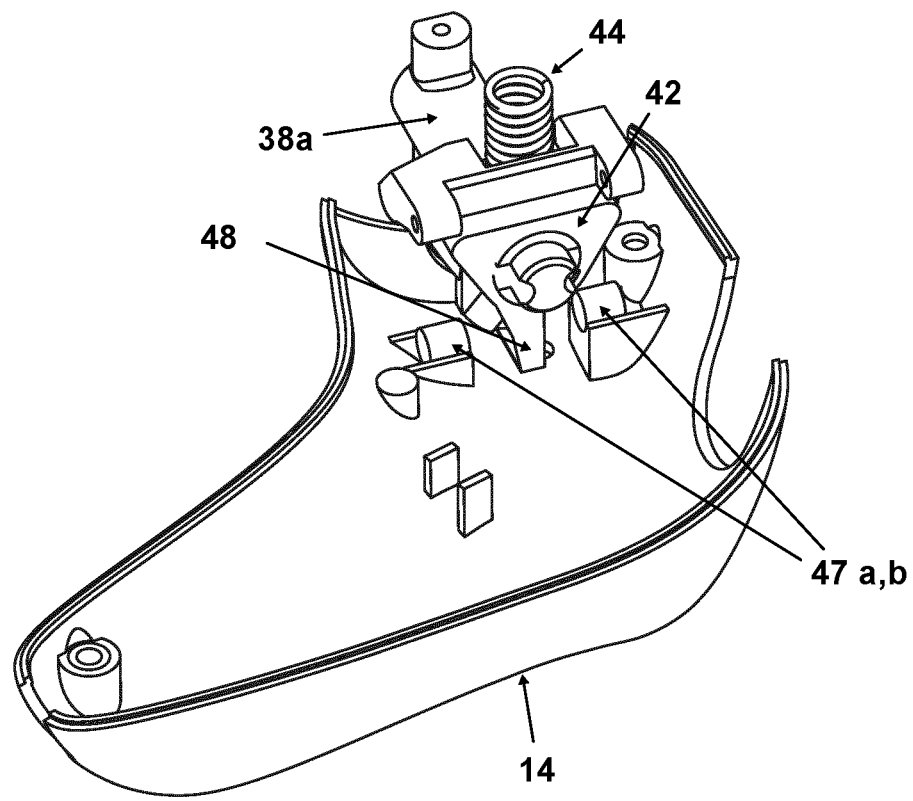

FIGS. 5A and 5B illustrate an exemplary coupling mechanism that allows the two handle members 12, 14 to rotate with respect to each other along the X-axis, which is parallel to the longitudinal axis of the shaft 30 used in the position sensing unit shown in FIGS. 3A and 3B. In this exemplary coupling mechanism, single axis position sensing is carried out using a single axis Hall sensor unit with two permanent magnets 47a, 47b secured to the second handle member 14. The shaft 30 is engaged with a seat 42 of the second handle member 14 in a pivotable manner. At the end of the shaft 30 adjacent to the seat 42, a Hall sensor 48 is mounted on the shaft 30. When the shaft 30 is pivoted with respect to the seat 42 as a result of the pitching action, the Hall sensor 48 generates a sensor signal that is proportional to the angular displacement of the shaft 30, and thus the sensor signal is also proportional to the angle of rotation of the first handle member 12 around the X-axis with respect to the second handle member 14.

In the single axis Hall sensor unit, a return spring 44 may be used to force the handle members 12, 14 back into their initial position at a pitching action. Due to this returning effect, the single axis position sensing unit also has a specific zero position, allowing a very accurate manipulation as a result of the elimination of the accumulative positioning errors.

When the shaft 30 is pivoted, a lateral cam 41 thereof forces an insert 45 to also pivot within the seat 42 and this insert 45 pushes a movable member 46 upward against the force of the return spring 44, which is unloaded in its idle state. The movable member 46 is pivotally coupled to the second handle member 14.

The above described articulated mechanism provides a control possibility by three degrees of freedom as the two handle members of the housing can be rotated relative to each other around three axes independently. Although it is preferred that in the idle position of the device, the three axes of the articulation of the handle members are mutually perpendicular to each other, it should be appreciated by those skilled in the art that the axes may also define other angles between each other in the idle position of the device.

It should be also appreciated by those skilled in the art that the linkage between the two handle member of the housing may be limited to have less than three degrees of freedom, for example only two or one degrees of freedom, by blocking rotation of the handle members with respect to each other along one or two axes. Mechanical stop members may be used within the coupling mechanisms of the linkage to prevent one handle member from pivoting relative to the other handle member along any axis.

In one embodiment, the manipulation control device further comprises at least one thumb mechanism, preferably one or two thumb mechanism. The one or more thumb mechanisms are arranged on the upper side of the housing of the device. Each thumb mechanism may be configured to provide up to three additional degrees of freedom for the manipulation control through specific movements of the thumbs of the user. Consequently, when two thumb mechanisms are included in the manipulations control device, it is adapted to control the movement of a physical or virtual object or objects simultaneously, altogether by up to nine degrees of freedom.

In some embodiments, wherein the manipulation control device comprises two thumb mechanisms, one of the thumb mechanisms may be configured to have only two degrees of freedom in the x and y directions, while its displacement along the z direction is blocked. This configuration allows an easier manipulation of the device as it is adapted to control the movement of a physical or virtual object or objects simultaneously, by up to eight degrees of freedom.

Figure 13:
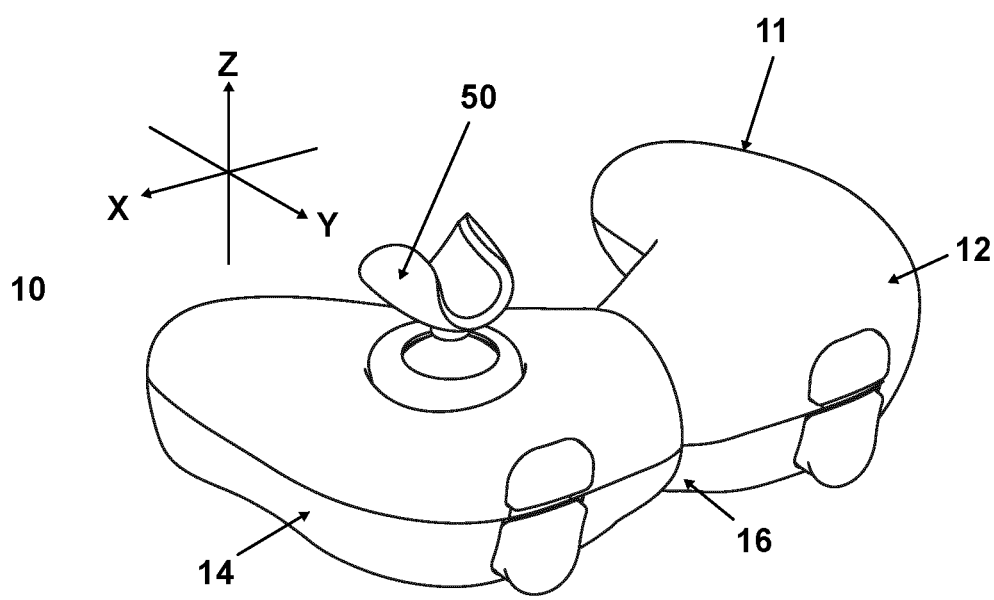
FIG. 13 schematically illustrates an exemplary embodiment of the manipulation control device according to a third aspect of the present invention.

In one embodiment, as schematically illustrated in FIG. 13, the manipulation control device 10 may comprise only one thumb mechanism. In this case, the single thumb mechanism may be arranged on the upper side of the housing 11 of the device 10, on either the first or the second handle member 12, 14. The single thumb mechanism is configured to provide three degrees of freedom for the manipulation control. Consequently, this embodiment of the manipulation control device 10 is adapted to control the movement of a physical or virtual object or objects simultaneously, by up to six degrees of freedom.

A thumb mechanism may allow a triple axis manipulation including a pivoting action around the X and Y-axes and a push-pull action along the Z-axis. As shown in FIG. 1 and other figures, each thumb mechanism comprises a thumb securing unit 50 for receiving the user's thumb. The thumb securing unit 50 may be closed rings or open rings designed for convenient insertion and stable holding of the thumbs therein. The structure and the operation of the thumb mechanism will be described with reference to FIGS. 6 to 10.

FIGS. 6A to 6C schematically illustrate the operation of an exemplary single axis coupling mechanism allowing movements of a thumb securing unit along the Z-axis. In this exemplary single axis coupling mechanism, a housing 52 is used to hold a spring 54 and to provide a support 55 for a positioning element 56 of the mechanism. The support 55 is rigidly attached to the housing 52. The positioning element 56 is secured to the spring 54 at its one end and pivotally coupled to a tilting element 58. The tilting element 58 is also coupled to the housing 52 in a pivotable manner. The initial idle state of the mechanism is shown in FIG. 6a. In this state the spring is unloaded.

In FIG. 6B a lower position of the single axis coupling mechanism is illustrated. In this position the activation part of the tilting element (i.e. the right side thereof in FIGS. 6A-C) is pushed down, so the positioning element 56 is pivoted due to the support 55 with compressing the spring 54, which, in turn, exerts a returning force to the tilting element 58 through the positioning element 56.

FIG. 6C depicts an upper position of the single axis coupling mechanism. In this position the activation part of the single axis coupling element is pulled up, so the positioning element 56 is pivoted due to the support 55 with expanding the spring 54, which, in turn, exerts a returning force to the tilting element 58 through the positioning element 56.

Due to the returning force exerted by the spring 54, the single axis position sensing unit of the thumb mechanism has a specific zero position, which allows a very accurate manipulation as a result of the elimination of the accumulative positioning errors. It is noted that the returning force of the spring 54 may be different in the opposite directions as the movement of the thumb requires different powers in the upward and downward directions due to anatomical reasons.

In some embodiments, the single axis coupling mechanism of a thumb securing unit may be configured to allow displacement in only one direction from its idle position, i.e. only upwards or downwards. To this end, the upward or downward motion of the positioning element 56 in the idle state (FIG. 6A) may be blocked by a respective locking element (not shown), thus the tilting element 58 can be moved either in an upward direction (as shown in FIG. 6C) or in a downward direction (as shown in FIG. 6B).

In some embodiments, the structure and the operation of the single axis coupling mechanism of at least one thumb mechanism may be different from those depicted in FIGS.

6A-6C. For example, the single axis coupling mechanism may comprise magnetic elements instead of or in addition to the spring 54. Other coupling mechanisms may also be conceivable.

Figure 8:
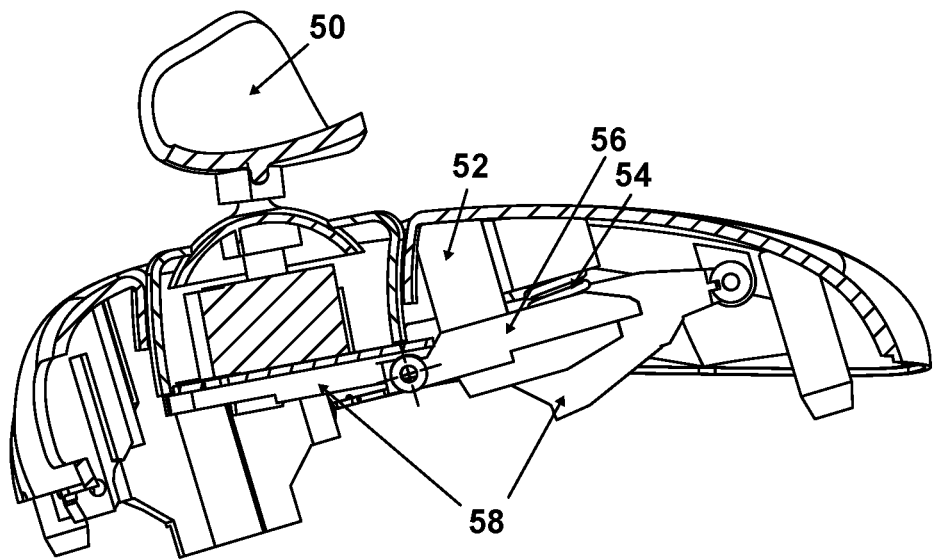
FIG. 8 illustrates the single axis coupling mechanism of FIG. 7 in sectional view.

FIG. 7 is an exploded view of the single axis coupling mechanism in one embodiment of the manipulation control device according to the invention, and FIG. 8 illustrates the same single axis coupling mechanism in a sectional view. In these figures the same reference numbers are used to indicate the elements as in FIGS. 6 and 7.

Figure 9:
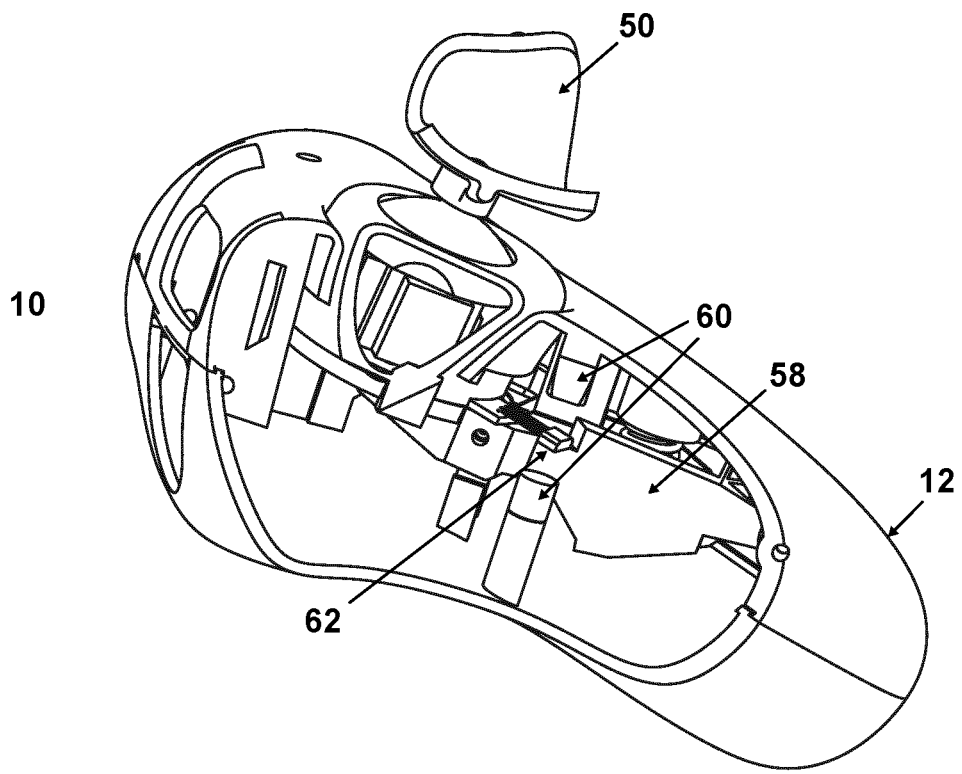
FIGS. 9 and 10 illustrate the linkage part of the thumb securing unit of an exemplary embodiment of the manipulation control device according to the invention in perspective view.

FIG. 9 illustrates the linkage part of the thumb securing unit in an exemplary embodiment of the manipulation control device according to the invention, wherein a single axis Hall sensor unit is integrated into the single axis coupling mechanism of the thumb securing unit as a position sensing unit for detecting movement of the thumb securing unit along the Z-axis. The single axis Hall sensor unit is mounted inside the housing of the handle members 12, 14. The sensor unit comprises two permanent magnets 60 on both sides of the tilting element 58 and a Hall sensor 62 is secured to the tilting element 58 between the two magnets 60. When the tilting element 58 is pushed down or pulled up, the Hall sensor 62 mounted thereon generates a sensor signal that is proportional to the displacement of the tilting element 58, and thus the sensor signal is also proportional to the vertical displacement of the thumb securing unit 50 along the Z-axis with respect to the respective handle member 12, 14.

Although the exemplary single axis coupling mechanism of the thumb securing unit described herein employs a single axis Hall sensor as a position sensor, it should be appreciated by those skilled in the art that other types position sensors, such as optical sensor, electromechanical sensor, and the like, may also be used in the manipulation control device 10 for sensing the linear displacement of the thumb securing unit s with respect to the first and second handle members 12, 14.

It should be appreciated by those skilled in the art that depending on the field of application of the manipulation control device, the single axis coupling mechanism of the thumb securing unit may be configured to operate only along a limited path, for example only within a range of movement below its zero position (where the returning spring is unloaded), or within a range of movement above its zero position by means of a stop member. In a particular embodiment of the device, vertical motion of the thumb securing unit may be fully blocked, thereby reducing the number of available degrees of freedom of the thumb securing unit.

Figure 10:
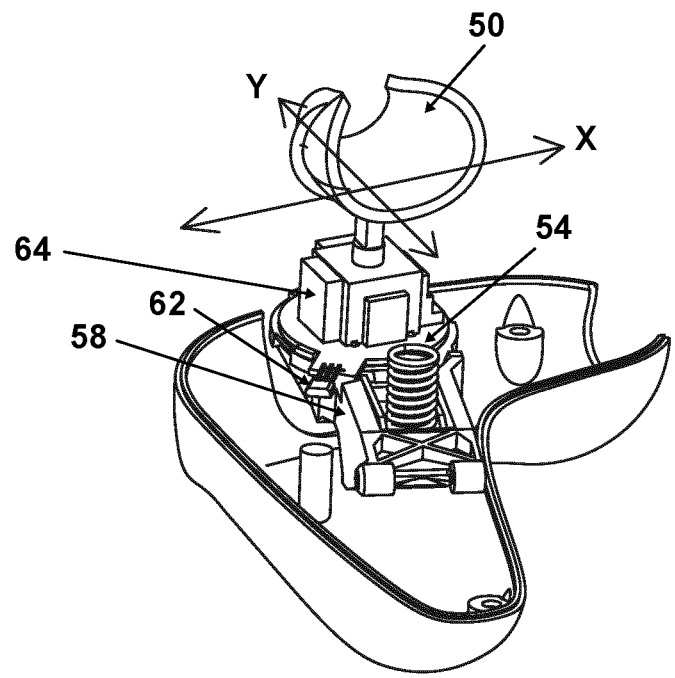

The dual axis pivoting operation of the thumb mechanism may be detected by a conventional analogue position sensor unit 64 secured to the activation part of the single axis coupling mechanism. In one embodiment, the thumb securing unit 50 may fixed to a stem projecting upwards from the analogue position sensor unit 64 as shown in FIG. 10, which depicts the structural elements of the whole thumb mechanism inside the handle member 12.

It should be also appreciated by those skilled in the art that the dual axis coupling mechanism of the thumb securing unit may also be limited to one degree of freedom by mechanically blocking, through a stop member, pivotal of the unit with respect to the housing of the device along either axis.

Figure 11A:
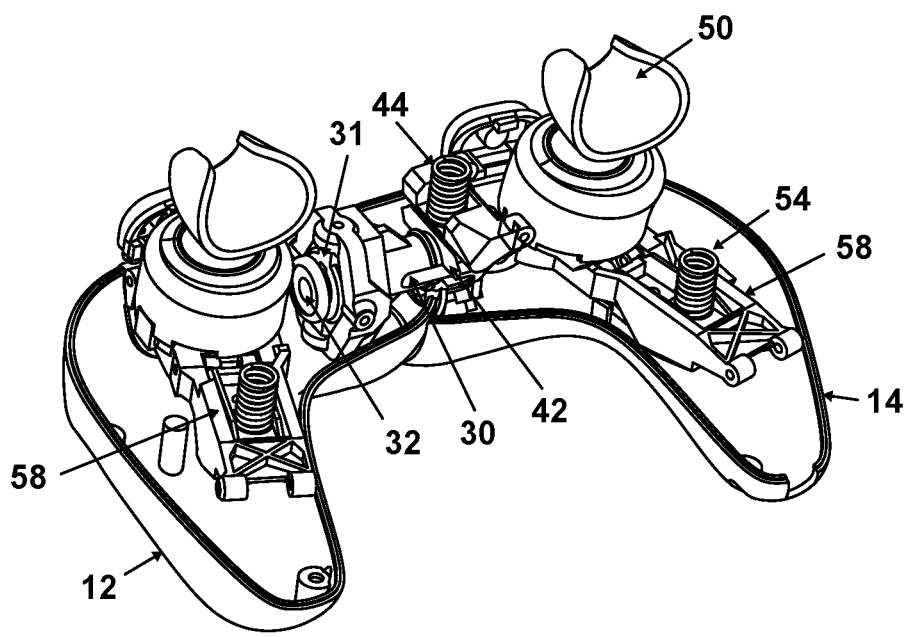
FIGS. 11A and 11B illustrate the internal structure of the manipulation control device according to the first aspect of the present invention in upper perspective view and bottom perspective view, respectively.
Figure 11B:
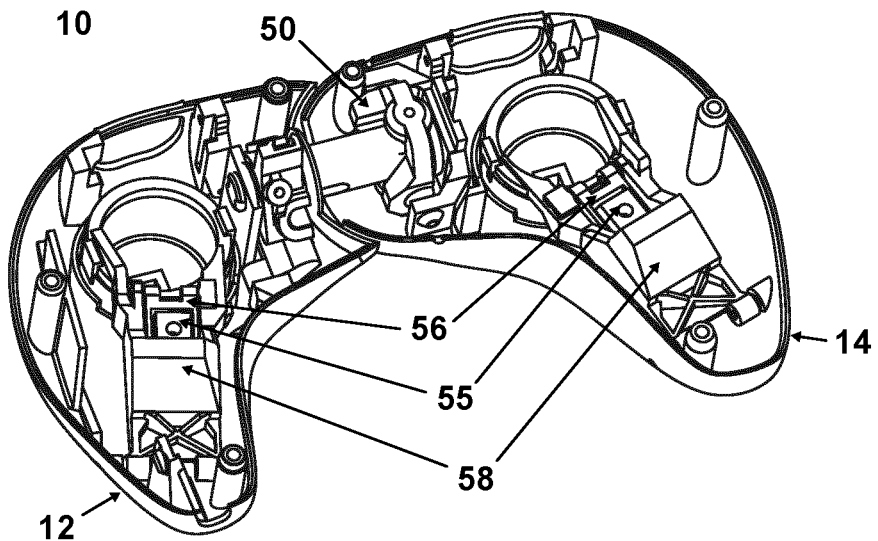

FIGS. 11A and 11B show the internal structure of the manipulation control device 10 according to one embodiment the present invention in an upper perspective view and a bottom perspective view, respectively, for illustrative purposes. In these figures, the arrangement of the various parts described above in connection with the exemplary coupling mechanisms is shown. For identifying the parts of the device, the same reference numbers are used herein as in the previous figures.

FIG. 11C illustrates the steps of assembling the two handle members 12, 14 of the manipulation control device 10 according to the first aspect of the present invention in perspective view from the bottom. Initially the two handle members 12, 14 are available in a separated form, both with many parts previously mounted therein. In the first step, the movable member 46 is inserted and fixed in a pivotable manner within the handle member 12. Next, the seat 42 with the insert 45 is mounted into the member 12, followed by pushing the shaft 30 into the seat 45, wherein the shaft 30 has already been mounted in the other handle member 14. Finally, a detent pin 80 is inserted into an end portion of the shaft 30, said end portion being pivotally guided in the seat 45.

In a further aspect, the present invention also relates to a manipulation control device that includes a one-piece housing with two thumb mechanisms, each of which providing multiaxis control with up to three degrees of freedom. An exemplary embodiment of the manipulation control device of the second aspect is schematically illustrated in FIG. 12.

Figure 12:
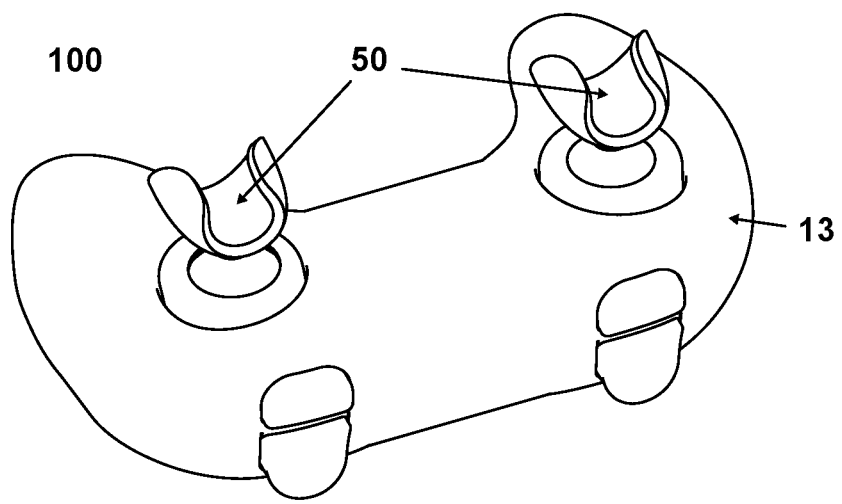
FIG. 12 schematically illustrates an exemplary embodiment of the manipulation control device according to a second aspect of the present invention.

As shown in FIG. 12, the manipulation control device 100 has a one-piece housing 13 with a similar or the same two-handed design as introduced above with respect to the device of the first aspect. In this case, the manipulation control device 100 has no central linkage, while it comprises two thumb mechanisms for the manipulations.

At least one of the two thumb mechanisms, preferably both of them, is configured to allow movement of the thumb securing units 50 in three independent directions, thus providing manipulation control by up to three degrees of freedom. The structure and the operation of the thumb manipulation mechanisms may be the same as described above with reference to FIGS. 6 to 10. This device 100 may be easier to use due to the simplified configuration of the housing 13 of the device. This embodiment of the manipulation control device 100 provides up to six degrees of freedom, but depending on the field of application of the device, the coupling mechanisms of the thumb securing units 50 may be mechanically blocked in one or more directions to provide a limited configuration, with the restriction that at least one of the thumb mechanisms is to allow the z-axis movement.

In one embodiment, a triple axis digital gyroscope unit may be integrated into the one-piece housing 13 of device 100, which is provided with two thumb mechanisms as described above.

The digital gyroscope unit, which may comprise a conventional digital gyroscope, is adapted to sense tilting of the housing 13 of the device 100 in three orthogonal directions and thus to generate a sensor signal indicative of the spatial angular movement of the housing 13 of the manipulation control device 100.

The manipulation control devices according to the present invention further comprise a conventional electronic circuitry for processing the sensor signals and based on said sensor signals, generating and transmitting manipulation control signals to a processor device, such as a computer, a drone, a surgery manipulation tool or the like. The control signals may be transmitted from the manipulation control device in a wired or wireless way. The manipulation control device may further comprise a battery or other power source for operating the electronic circuitry and the sensors of the device. When the manipulation control device is attached to the processor device through a wire, the power supply of the manipulation control device may be provided by the controlled device through the wire and thus no battery is necessary within the manipulation control device.

It should be noted that the use of the manipulation control device described herein is not limited to the control of computer games or other computer applications. The manipulation control device according to the present invention may equally be used as a manipulation tool also in medical surgery, drone control, and many other fields where manipulation of an object or objects in either a physical environment or in a virtual environment by nine degrees of freedom is required.

The manipulation control device according to the present invention may also be provided with one or more traditional input controls on the housing of the device such as buttons or triggers for additional control options.

The invention claimed is:

1. A multiaxis manipulation control device (10, 100) comprising:
    a housing (11, 13),
    at least one thumb mechanisms arranged on the housing (11, 13), each thumb mechanism comprising a thumb securing unit (50) for holding a user's thumb and a thumb linkage connecting said thumb securing unit (50) to the housing (11, 13), and further comprising a sensor unit for detecting movements of the thumb securing unit (50) independently in three directions and providing a sensor signal, and
    an electronic circuitry for processing said sensor signals and based on said sensor signals, generating and transmitting manipulation control signals to a processor device;
    wherein said thumb linkage includes a first coupling mechanism allowing the securing unit (50) to pivot around a first axis (X) and a second axis (Y) perpendicular to said first axis, and for at least one tumb mechanism, a second coupling mechanism allowing the thumb securing unit (50) to move along a third axis (Z), which is perpendicular to said first and second axes and aligns with a longitudinal axis of the thumb mechanism,
    wherein the sensor unit of each of the at least one thumb mechanisms comprises a dual axis position sensing unit arranged in said first coupling mechanism for detecting the rotation of the thumb securing unit (50) around the first and second axes (X, Y), and
    wherein the sensor unit of at least one thumb mechanisms further comprises a single axis position sensing unit arranged in said second coupling mechanism for detecting the displacement of the thumb securing unit (50) along the third axis (Z).

2. The manipulation control device (10, 100) of claim 1, wherein the second coupling mechanism of the thumb linkage comprises:
    a housing (52) secured to the housing (11, 13) of the device (10, 100),
    a return spring (54) mounted on the housing (52) at its one end,
    a positioning element (56) pivotally coupled to a tilting element (58) and engaged with the other end of the return spring (54), and movably leaning against a support (55) rigidly attached to said housing (52), said tilting element (58) being pivotally coupled to said housing (52).

3. The manipulation control device (10, 100) of claim 1, wherein the single axis position sensing unit of the second coupling mechanism of the thumb linkage comprises:
    a Hall sensor (62) fixed to the tilting element (58), and
    two permanent magnets (60) fixedly arranged on two sides of said Hall sensor (62).

4. The manipulation control device (10) of claim 1, wherein
    the housing (11) comprises:
        first and second handle members (12, 14), and
        a linkage (16) connecting said first and second handle members (12, 14), said linkage including a shaft (30) movably coupled, at its first end, to one of the handle members (12, 14), and rotatably coupled, at its second end, to the other handle member (12, 14), and
    wherein the shaft (30) is adapted to pivot around a second axis (Y) and a third axis (Z) perpendicular to said second axis, and to rotate around a longitudinal axis thereof extending along a first axis (X), which is perpendicular to said second and third axes, and
    wherein the sensor unit of the housing (11) further comprises:
        a dual axis position sensing unit arranged at the first end of the shaft (30) for detecting the angular displacement of the shaft (30) around said second and third axes (Y, Z), and
        a single axis position sensing unit arranged at the second end of the shaft (30) for detecting the angle of rotation of the shaft (30) around its longitudinal axis extending along said first axis (X).

5. The manipulation control device (10) of claim 4, wherein the linkage of the housing (11) further comprises:
    a first spring-based return mechanism for providing force to cause the first end of the shaft (30) to return into an idle position after an angular displacement around the second and third axes (Y, Z), and
    a second spring-based return mechanism for providing force to cause the second end of the shaft (30) to return into an idle position after a rotation around its longitudinal axis extending along said first axis (X).

6. The manipulation control device (10) of claim 4, wherein the dual axis position sensing unit of the sensor unit of the housing (11) comprises:
    a permanent magnet (32) secured to the first end the shaft (30), and
    a dual axis Hall sensor (34) fixedly arranged adjacent to the first end of the shaft (30).

7. The manipulation control device (10) of claim 4, wherein the single axis position sensing unit of the sensor unit of the housing (11) comprises:
    a single axis Hall sensor (48) mounted on the second end of the shaft (30), and
    two permanent magnets (47a, 47b) fixedly arranged on two sides of the single axis Hall sensor (48).

8. The manipulation control device (10) of claim 5, wherein the first spring-based return mechanism comprises a spring (35) arranged within the hollow of the shaft (30) and leaning against a piston (31) carrying the permanent magnet (32), said piston (31) being movably guided in the hollow of the shaft (30).

9. The manipulation control device (10) of claim 5, wherein the second spring-based return mechanism comprises:
    a lateral cam (41) formed on the shaft (30),
    an insert (45) pivotally mounted in a seat (42) fixed to the second handle member (14) and engaged with said lateral cam (41),
    a movable member (46) pivotally coupled to the second handle member (14) and engaged with said insert (45), and a spring (44) fixed to the second handle member (14) at its one end and engaged with the movable member (45) at its other end.

10. The manipulation control device (100) of claim 1, wherein the housing (13) is formed as one piece.

11. The manipulation control device (100) of claim 10, further comprising a sensor unit within said housing (13) for detecting movements of the housing (13) in three directions and for providing a sensor signal.

12. The manipulation control device (100) of claim 11, wherein the sensor unit of the housing (13) comprises a triple axis digital gyroscope.

13. The manipulation control device (10, 100) of claim 1, further comprising at least one stop member for mechanically blocking the rotation or the displacement of at least one coupling mechanism in a respective direction.

* * * * *